Nov. 24, 1925.

J. T. JANNEY 1,562,888

QUICK FACING TRAY FOR FRUIT PACKING

Filed July 5, 1923

Inventor
John Tabb Janney.
By Prentiss, Stone & Boyden
Attorneys.

Patented Nov. 24, 1925.

1,562,888

UNITED STATES PATENT OFFICE.

JOHN TABB JANNEY, OF MARTINSBURG, WEST VIRGINIA.

QUICK-FACING TRAY FOR FRUIT PACKING.

Application filed July 5, 1923. Serial No. 649,647.

*To all whom it may concern:*

Be it known that I, JOHN TABB JANNEY, a citizen of the United States, residing at Martinsburg, in the county of Berkeley and State of West Virginia, have invented certain new and useful Improvements in Quick-Facing Trays for Fruit Packing, of which the following is a specification.

This invention relates to the packing of fruit and provides equipment for quickly facing the lower end of a container when it is being packed. This lower end, thus first packed, becomes the top of the container and the first end to be opened.

The general object of the invention is to facilitate the careful and uniform packing of fruit and to make possible inspection of the selected facing fruit after they are in position and before they are lowered into the container.

One feature of the invention is the provision of a tray in which selected fruit is positioned stem end down, and which tray is lowered into the bottom end of the barrel or other container and seated on the end wall, after which the barrel is completely filled and closed. The tray remains in place until the barrel is opened, at which time it is necessary to remove the bottom of the tray, which is now in an inverted position, in order to inspect the fruit.

Another feature of the invention involves the shape of the tray, which has a marginal side wall around a flat bottom, and which has side handles projecting from said side wall, one on either side of said tray, and serving as handles by which the operator may hold the tray while it is being lowered to position within the barrel.

Another feature of the invention involves the use of corrugated paper or other yieldable substance, as the material of the tray. In this way, the tray bottom serves as the usual disk of card board to protect bruising of the fruit. At the same time, the shape of the tray makes it sufficiently rigid to receive and hold several layers of fruit without collapsing. Another feature of the invention is the use of a tray which has the bottom thereof separable from the side wall. One specific adaptation includes the use of a cord or wire for cutting the bottom disk away from the side wall. The result obtained by using a separable tray bottom is that the container may be inspected without removing the entire tray and without removing the tray side walls, which removal might result in disturbing the fruit.

The above and other details and advantages are described and claimed in the following specification and claims and the structure is illustrated in the accompanying drawing, in which:—

Figure 4:
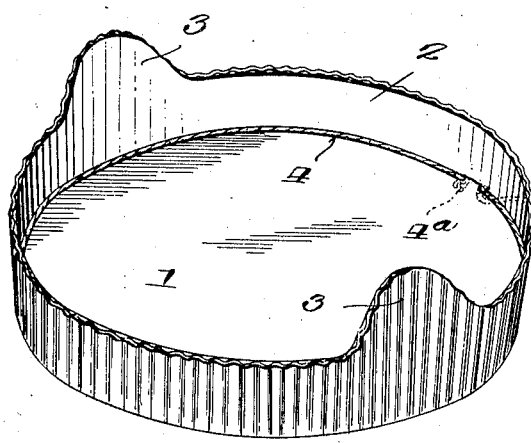
Figure 5:
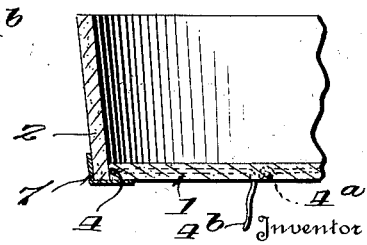

Fig. 4 is a perspective view looking downwardly on the tray, which is represented as formed of corrugated packing card board and which has a cord positioned around the bottom of the tray adjacent the side wall for severing the bottom from the side walls; and Fig. 5 represents, in section, a fragmentary view of a modified form showing the cord positioned around the tray bottom which is secured to the side wall by a common connecting corner piece which is adapted to be severed by the cord.

Like parts are indicated in the different figures by like reference characters.

Figure 1:
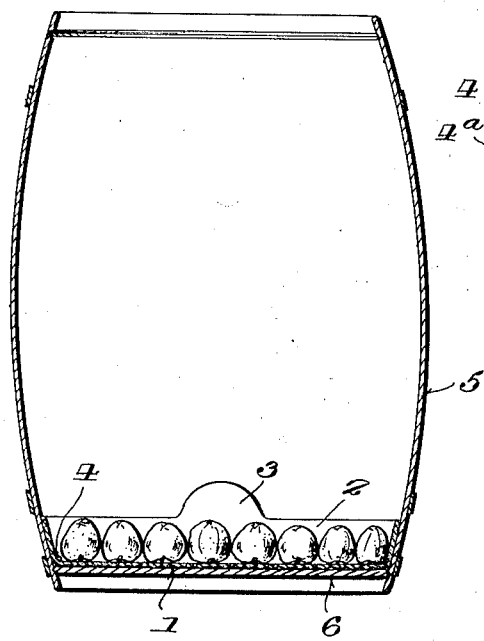
Fig. 1 represents a vertical central section through a barrel showing the quick facing tray of this invention at the bottom of the barrel and containing selected fruit.
Figure 2:
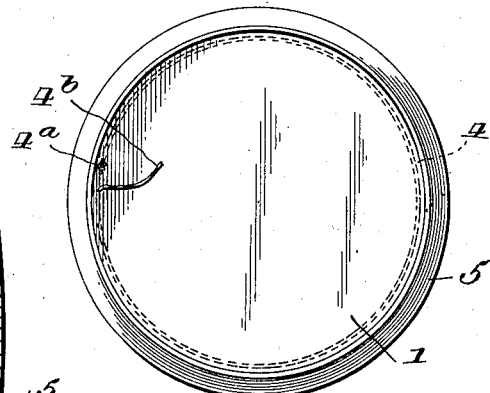
Fig. 2 represents a top plan view of a packed barrel, such as the barrel of Fig. 1 after it has been packed and inverted, with the end boards removed, showing the bottom of the tray uppermost.
Figure 3:
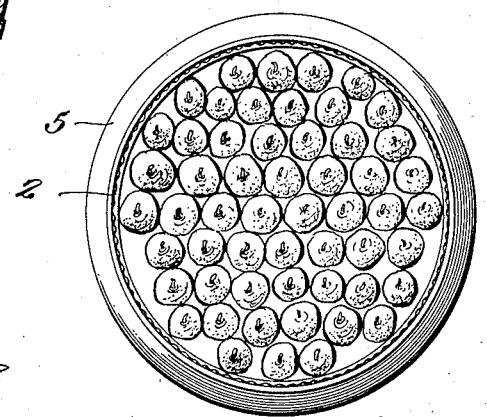
Fig. 3 represents the same barrel as illustrated in Fig. 2 but with the bottom of the tray removed, leaving the side wall of the tray in position encircling the fruit.

Referring in detail to the drawing, 1 indicates the bottom of the tray which is preferably formed of light weight material such as card board or paper. This bottom portion should have the general shape of the bottom of the container in which it is to be used. In the form illustrated, the container is a barrel and accordingly, the bottom disk is represented as circular. Side walls 2 project from the marginal edges of the disk 1 and may be formed of the same material as the bottom. In Figs. 3 and 4, the material is represented as formed of corrugated paper having an inner lining of paper and thus providing the cellular structure commonly used in the protecting end disks for apple barrels. The side walls 2, thus extending as an annular flange from the bottom 1, have projecting handle portions 3 which are illustrated as extensions of the material of the side walls and which constitute flaps or handles which may be held one in either hand by the person packing the barrel. The invention contemplates that the tray shall be packed with one or more layers of fruit specially selected to serve as the facing layers for the top of the barrel. The fruit is placed, stem downwardly, in the tray, and when thus properly arranged, the tray is lowered to the bottom of the barrel so as to rest on the lower end closure, as will be described. The bulk of the barrel contents may then be filled in. It is the usual practice to build up the fruit several inches above the upper end of the barrel, applying the upper end closure boards and then to compress the fruit thus piled up until the contents are fairly tight and the closure is brought into proper position for fastening with hoops or other means. Means for severing the side wall of the tray from the bottom thereof is provided by a cord or wire 4 which is illustrated in Figs. 1, 2 and 4 as extending around the inside of the tray in the angle formed between the bottom and side walls. The string projects through the tray and one end is terminated in a knot 4ª and the other end 4ᵇ extends outwardly for several inches where it may be grasped by the person who is opening the barrel and used to cut the bottom from the side walls. A pulling movement on the string around the packed barrel will result in cutting the material of the tray and severing the bottom portion from the side walls. In Fig. 1, the tray is shown lowered into the barrel 5 and resting on the bottom boards 6, which latter becomes the top end and the first to be opened after the barrel is packed. It will be observed that the material of the tray bottom by being formed of corrugated paper or other yieldable material thus serves as the usual protecting sheet of card board. When the barrel is opened, the top boards 6 are removed and it becomes necessary to remove the tray bottom 1 in order to inspect the fruit. The appearance of the tray and barrel before inspection and after the removal of the top boards is as illustrated in Fig. 2. The person opening the barrel grasps the free end of the cord 4ᵇ and draws the cord around the upper edge of the barrel following the general direction of the dotted line which represents the string 4. The tray end 1 is thus removed as a disk leaving the top layer of fruit, as illustrated in Fig. 3 with the side walls 2 still in position around the inner upper edge of the side walls of the barrel. The tray might be lifted out bodily, but to do this, might possibly upset the fruit and disarrange it. If the barrel is merely open for inspection, it can again be temporarily closed by covering the fruit by the disk 1 and replacing the boards 6.

In the construction illustrated in Fig. 5, an arrangement is illustrated by which the severing of the string may cut a fastening strip 7 intsead of being used to cut through the material of the tray. In this form, the tray bottom 1 and the tray side walls 2 are formed of separate pieces and are secured together by a common binding strip of tough paper or cloth, indicated at 7. The cord 4 is shown as encircling the bottom disk 1 from which position it may be drawn by pulling movement on the free end 4ᵇ.

The invention provides particularly for the use of yieldable cushioning corrugated or other cellular card board or paper material. The material of the tray may be varied and the number of parts of the tray may be changed without departing from the scope of the invention. The invention is illustrated as used in connection with barrels, but the tray may be used in boxes or other containers which have a different shape, but which may be packed preferably lower end first.

With the tray of this invention, it becomes possible for the foreman in charge of large packing operations to personally inspect the arrangement and selection of the fruit which thus is to become the top several layers of the fruit barrel. Heretofore, it has been the common practice for the person packing the barrel to lean over into the barrel and attempt to arrange the fruit while the barrel is in the position shown in Fig. 1. The packer is thus necessarily in his own light, and the foreman has little opportunity to know definitely how the fruit is packed at the bottom unless, after the barrel is finally closed, he should reopen the barrel to inspect the top end which is thus first packed. It is believed that this present invention simplifies packing operations.

I claim:—

1. A facing tray for packaging fruit comprising a bottom portion adapted to constitute the top cover end disk and a non-collapsible annular side wall extending from the periphery of said bottom portion and adapted to confine the facing fruit against lateral displacement and prevent crushing of the fruit against a container side wall, said bottom portion being separable from said side wall, the combined bottom and side wall providing a tray sufficiently rigid to support without collapsing the weight of the facing layers of fruit while the tray is packed, lowered into a container and constantly thereafter until the container is opened.

2. A facing tray for packaging fruit comprising a bottom portion adapted to constitute the top cover end disk, an annular side wall extending from the periphery of said bottom portion, and means for severing said bottom portion from said side wall, the combined bottom and side wall providing a tray sufficiently rigid to support without collapsing the weight of the facing layers of fruit while the tray is packed, lowered into a container and constantly thereafter until the container is opened.

In testimony whereof I affix my signature.

JOHN TABB JANNEY.